United States Patent [19]
Potter

[11] Patent Number: 6,068,023
[45] Date of Patent: *May 30, 2000

[54] VALVE FOR CLEARING AIR CONDITIONING DRAIN LINES

[76] Inventor: Andrew M. Potter, 15424 Mound, Hockley, Tex. 77447

[*] Notice: This patent is subject to a terminal disclaimer.

[21] Appl. No.: 09/028,620

[22] Filed: Feb. 24, 1998

Related U.S. Application Data

[63] Continuation-in-part of application No. 08/599,621, Feb. 9, 1996, Pat. No. 5,722,458.
[51] Int. Cl.$^7$ .................................................... A16K 11/06
[52] U.S. Cl. ...................... 137/625.47; 137/240; 137/268
[58] Field of Search ..................................... 137/240, 385, 137/268, 625.47; 251/56; 62/303

[56] References Cited

U.S. PATENT DOCUMENTS

| | | |
|---|---|---|
| 215,928 | 5/1879 | Hutchinson . |
| 1,079,555 | 11/1913 | Hopewell . |
| 1,268,379 | 6/1918 | Murphy . |
| 1,274,103 | 7/1918 | Story . |
| 1,655,796 | 1/1928 | Murphy . |
| 2,318,638 | 5/1943 | Scott . |
| 3,550,612 | 12/1970 | Maxon . |
| 3,976,095 | 8/1976 | Koch et al. ............................. 137/385 |
| 4,203,460 | 5/1980 | Priese . |
| 4,553,566 | 11/1985 | Barclay et al. . |
| 4,671,311 | 6/1987 | Hepperle et al. ....................... 137/268 |
| 4,998,412 | 3/1991 | Bell . |
| 5,085,244 | 2/1992 | Funk . |

*Primary Examiner*—John Fox
*Attorney, Agent, or Firm*—Akin, Gump, Strauss, Hauer & Feld, L.L.P.

[57] ABSTRACT

A valve assembly which is placed in an air conditioner drain line for cleaning and maintenance of the drain line. The valve may be positioned to permit water or condensate to run through the drain line to a sewage drain. When the line needs to be serviced, usually due to clogging, the valve plug can be rotated to seal off the drain line upstream or downstream of the valve assembly. A slight pressure or vacuum may then be introduced at the top of the valve to force clogs loose. The valve optionally has a receptacle at the bottom so that an anti-fungus pellet may be dropped in which inhibits the fungus growth.

19 Claims, 3 Drawing Sheets

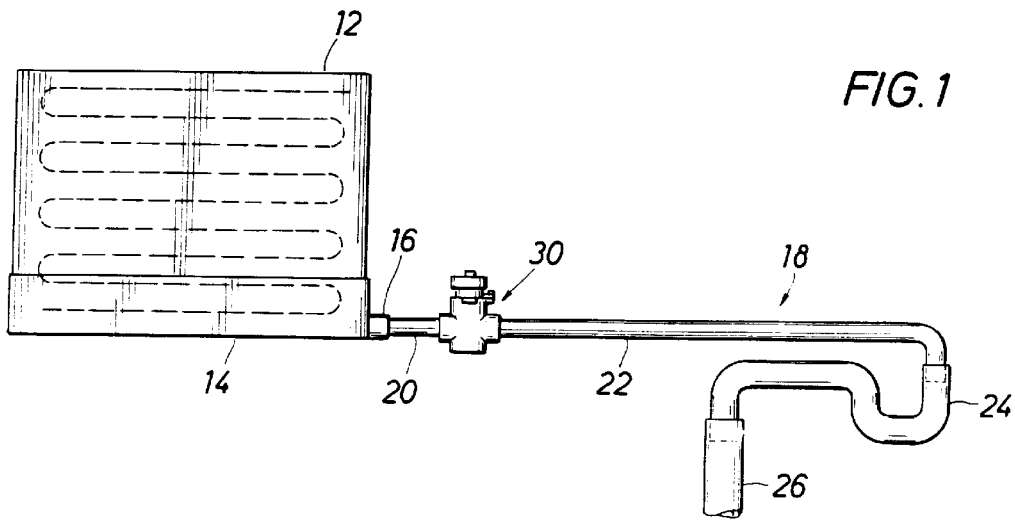
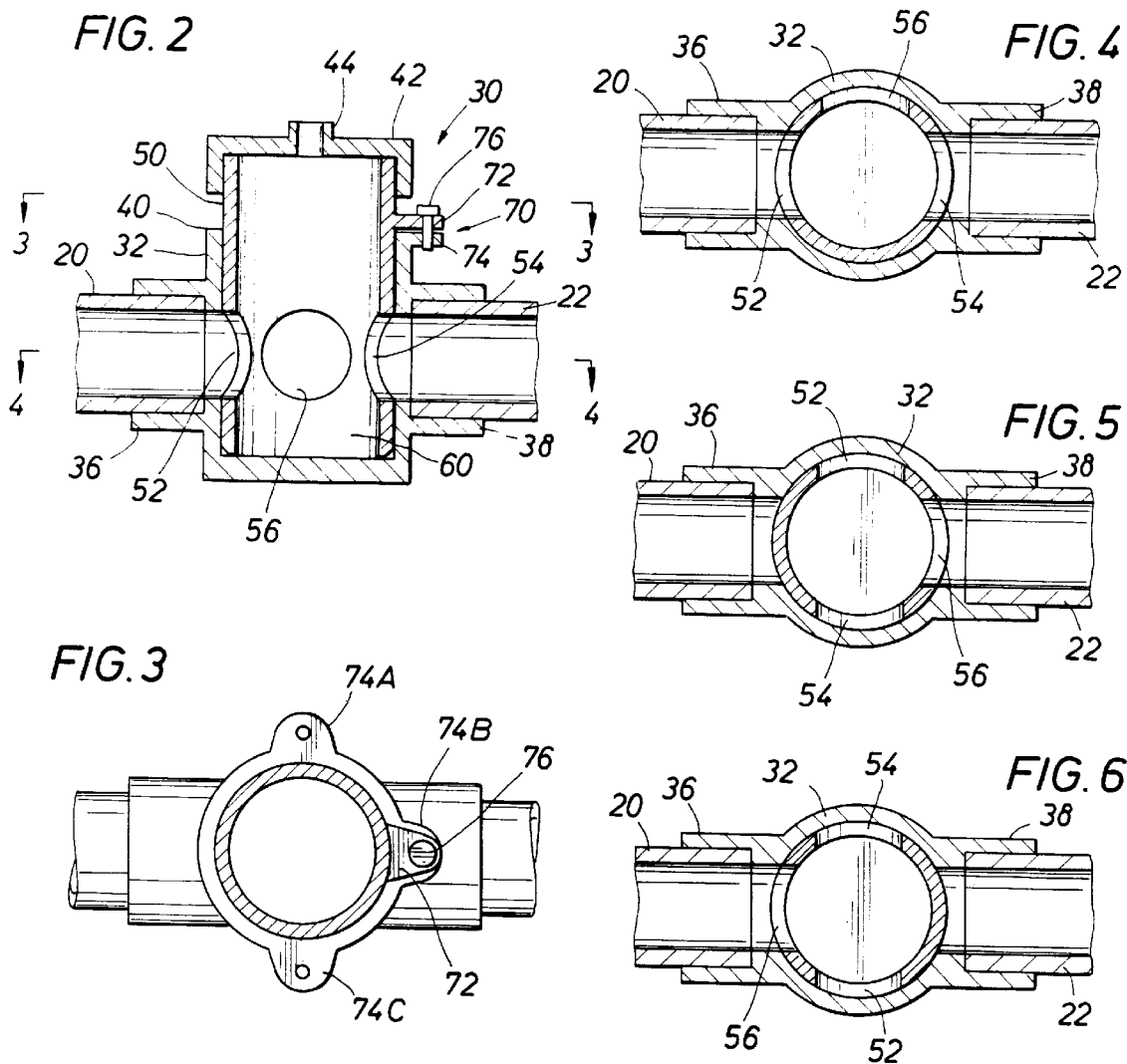

VALVE FOR CLEARING AIR CONDITIONING DRAIN LINES

CROSS-REFERENCE TO RELATED APPLICATIONS

This application is a continuation-in-part application of U.S. Ser. No. 08/599,621, filed Feb. 9, 1996, now U.S. Pat. No. 5,722,458.

FIELD OF THE INVENTION

This invention relates to an apparatus for the servicing of drain lines. More specifically, the invention relates to an apparatus which allows access for cleaning and maintaining condensate drain lines on air conditioners and refrigeration equipment.

BACKGROUND OF THE INVENTION

Air conditioning systems are commonly equipped with a drain pan below the evaporator coils. The drain pan is placed below the evaporator coils to collect condensate formed by humid air contacting the cold temperatures of the air conditioning system's evaporator coils. The drain pan collects the condensate and directs it to a sewer system or an outside area through a drain line.

It is not uncommon for the drain line from the drain pan to clog due to algae or fungus growing in those lines or from other debris. Blockage of a drain line can result in condensate spilling over the drain pan and causing water damage to the surrounding area.

Typically, to correct clogging or blockage problems, the service attendant has had to cut the drain line or disconnect it from the drain pan. Through a difficult procedure, the drain line could then be cleared by applying pressure to the line. One problem with this procedure is that when cutting or disconnecting a blocked drain line there was always the potential of spillage from the drain line. Additionally, after the drain line had been cut and the blockage cleared, a repair or partial replacement of the drain line is required.

One attempt to address the problem of clearing and cleaning air conditioning drain lines was disclosed in U.S. Pat. No. 5,085,244. The assembly disclosed in this patent included a valve mechanism to which a first T-connector was joined on the upstream side of a valve mechanism and a second T-connector was joined on the downstream side. The T-connectors had engagement means for attaching pressure or vacuum sources. When a drain line in which this assembly had been installed became blocked, the valve mechanism would be closed and a pressure or vacuum source would be attached to the T-connector corresponding to the portion of drain line which was thought to be blocked.

An attempt to address the more general problem of cleaning pipes was disclosed in U.S. Pat. No. 1,274,103. This patent disclosed a valve device which had a cylindrical valve plug which did not obstruct pipe flow in its normal position but could be rotated to block the pipe either upstream or downstream of the valve. The valve plug had an axial bore from the top of the valve plug which allowed live steam or air to be injected through the valve and into the portion of the pipe which was not blocked by the valve. The disclosed valve device includes a non-removable valve stem and was built to provide an oil tight seal during service and was intended only for removing blockages from pipes by using positive pressure from steam or air.

SUMMARY OF THE INVENTION

The present invention is a valve assembly which is placed in an air conditioner's drain line downstream of the drain pan, but before the drain line terminates into a sewage drain or other outside area. The valve assembly has an first position which permits water to run through the drain line to the sewage drain. When servicing of the line, usually due to clogging upstream of the present invention, the valve plug can be rotated to a second position to seal off the drain line downstream the present invention. A slight pressure or vacuum can then be introduced at the top of the present invention which forces the clog loose at the junction of the drain line and the drain pan. The valve plug can also be rotated to a third position to close off the drain line upstream of the present invention. Pressure or a vacuum can be introduced at the present invention to unclog the drain downstream the present invention. The valve plug in the present invention is easily removable and can be lifted out and reinserted without taking the drain line out of service. Additionally, the invention optionally includes a receptacle at the bottom so that the service attendant can drop an anti-fungus pellet which inhibits the growth of fungus.

BRIEF DESCRIPTION OF THE DRAWINGS

A better understanding of the invention can be obtained when the detail description set forth below is reviewed in conjunction with the accompanying drawings, in which:

FIG. 1 is an elevation view of an air conditioning unit drain system including the preferred embodiment of the present invention;

FIG. 2 is a detailed cross sectional elevation view of the preferred embodiment of the present invention in which the valve plug is in the first position for flow through the drain line;

FIG. 3 is a cross sectional view taken along line 3—3 of FIG. 2;

FIG. 4 is a cross sectional view taken along line 4—4 of FIG. 2;

FIG. 5 is a modified cross sectional view of FIG. 4 but in which the valve plug is positioned to close off the upstream side of the drain line;

FIG. 6 is a modified cross sectional view of FIG. 4 but in which the valve plug is positioned to close off the downstream side of the drain line;

DETAILED DESCRIPTION OF PREFERRED EMBODIMENT

Figure 7:
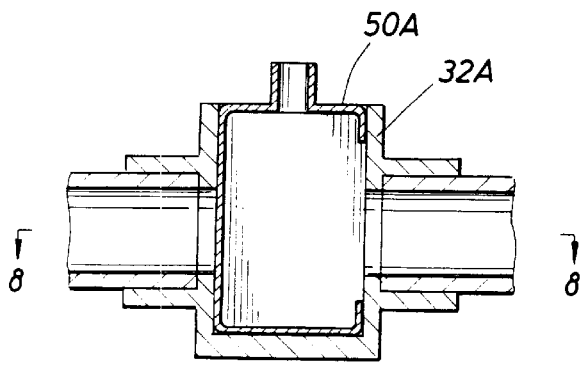
FIG. 7 is a cross sectional elevation view of an second embodiment of the present invention.

As shown in FIG. 1, the present invention is a valve assembly 30 which is installed in a drain line 18 coming off of an air conditioning system's evaporator coils 12. The valve assembly 30 is installed downstream of a coupling 16 which connects a drain pan 14 to drain line 18. Under normal operating conditions, water which condenses on air conditioning system's evaporator coils 12, drips down and collects in drain pan 14. The water then flows into the upstream portion 20 of drain line 18 and through valve assembly 30. The water then flows into the downstream portion 22 of drain line 18, through a plumber's trap 24, and into a sewer line 26.

As shown in FIG. 2, valve assembly 30 has a cylindrical valve body 32 which is hollow and open at a top 40. Valve body 32 has an upstream inlet member 36 and a downstream outlet member 38. It is preferred that valve body 32 be constructed from polyvinyl chloride ("PVC"), the same material from which drain line 18 is typically constructed. Other materials of construction which are used in plumbing fixtures such as other plastics, brass, or cast metals could be used to construct valve body 32.

Upstream inlet member 36 and downstream outlet member 38 are used to connect valve assembly 30 to upstream 20 and downstream 22 portions, respectively, of drain line 18. Inlet member 36 and outlet member 38 are sized to be equivalent to standard PVC plumbing fittings for easy connection. Typically, inlet member 36 and outlet member 38 are equal in size.

Valve assembly 30 has a valve plug 50 which is placed inside the hollow valve body 32. Valve plug 50 is cylindrical in shape and is also hollow. Valve plug 50 has a first flow hole 52 and a second flow hole 54 which are directly opposite of each other on cylindrical valve plug 50. A third flow hole 56 is centered on valve plug 50 preferably perpendicularly to first flow hole 52 and second flow hole 54. Flow holes 52, 54, and 56 are preferably equivalent in size to the inside diameter of upstream inlet member 36 and the downstream outlet member 38.

The outside diameter of cylindrical valve plug 50 is slightly smaller than the inside diameter of cylindrical valve body 32 such that valve plug 50 proximally engages the inside walls of valve body 32 yet can be rotated or removed easily, even during passage of fluid through valve assembly 30.

When valve plug 50 is installed inside valve body 32, valve plug 50 can be covered by a valve cover 42. Valve cover 42 fits tightly over valve plug 50 and may contain a vent 44.

FIGS. 2 and 4 show valve plug 50 aligned to a first position which allows flow of fluid through valve assembly 30 as fluid runs down drain line 18. First flow hole 52 is aligned with inlet member 36 and second flow hole 54 is aligned with the outlet member 38. Third flow hole 56 is aligned against the inside wall of valve body 32.

As shown in FIG. 6, valve plug 50 can be rotated ninety degrees to a second position. In this second position, third flow hole 56 is aligned with inlet member 36 while first flow hole 52 and second flow hole 54 are aligned against the inside wall of valve body 32. When valve plug 50 is rotated into this second position, portion 22 of drain line 18 is closed off and valve assembly 30 can be used to clear portion 20 of drain line 18 by applying pressure through valve plug 50 and forcing debris out of upstream drain line 20 and back into drain pan 14. Alternatively, a vacuum can be applied to pull debris from upstream drain line 20 forward into valve assembly 30 where it can be removed.

As shown in FIG. 5, valve plug 50 can be rotated to a third position, one hundred and eighty degrees from the second position, to clear line blockage within portion 22 of drain line 18, downstream of valve assembly 30. When valve plug 50 is in the third position, portion 20 of drain line 18 is closed off and third flow hole 56 is aligned with downstream outlet member 38. First flow hole 52 and second flow holes 54 are aligned against the inside wall of valve body 32. Line clearing of portion 22 of drain line 18 in this third position can also be accomplished with pressure or vacuum.

As shown in FIGS. 2 and 3, valve assembly 30 can be equipped with a lock 70 which prevents valve plug 50 from being rotated from the position in which it has been place by the air conditioning service technician. Lock 70 prevents inadvertent rotation of valve plug 50 while drain line 18 is in service. Inadvertent rotation could block drain line 18 an result in an overfill of drain pan 14. Lock 70 may include an upper latch 72 protruding from valve plug 50, lower latches 74A, 74B, and 74C, and a locking pin 76 which slides downward through upper latch 72 and into either lower latch 74A, 74B, or 74C depending upon the desired position of valve plug 50. Alternatively, the lock may consist only of upper latch 72 and notches cut into valve body 32 such that upper latch 72 rests in the notch associated with the desired position. Other similar means of locking valve plug 50 into position will be apparent to one skilled-in-the-art based on this disclosure.

Valve body 32 can also be equipped with a tablet treatment chamber 60. An anti-fungus treatment tablet can be placed inside treatment chamber 60 to prevent algae or fungus from building up in valve body 32 or in downstream drain line 22. As condensate drains into valve assembly 30, treatment chamber 60 is filled and the treatment table slowly dissolves. Once the treatment chamber has been completely filled with condensate, additional drainage will force the treated condensate out of treatment chamber 60 and into downstream drain line 22 thereby treating downstream drain line portion 22.

Figure 9:
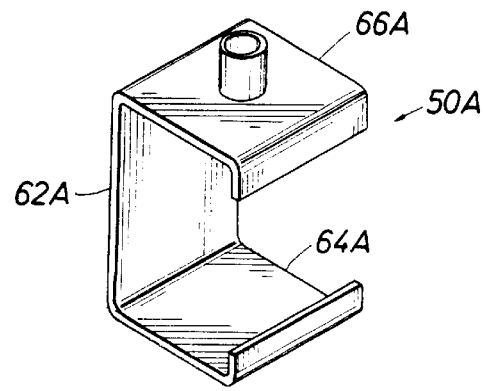
FIG. 9 is an isometric view of the valve plug from the second embodiment of FIG. 7.
Figure 8:
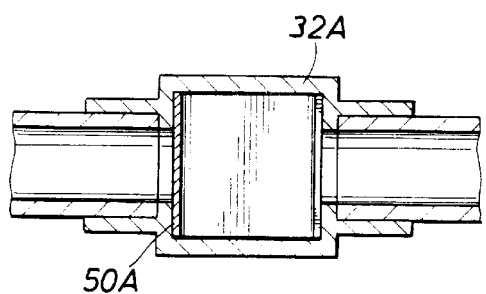
FIG. 8 is a cross sectional view taken along line 8—8 of FIG. 7.

FIGS. 7, 8 and 9 show a second embodiment of the present invention in which valve body 32A is rectangularly shaped. As shown in FIG. 9, in this embodiment valve plug 50A consists of a blocking wall 62A, a bottom support 64A, and a top support 66A. Valve plug 50A is rotated by lifting valve plug 50A completely out of valve body 32A and reinserting valve plug 50A such that blocking wall 62A covers upstream inlet member 36A or downstream outlet member 38A.

Figure 10:
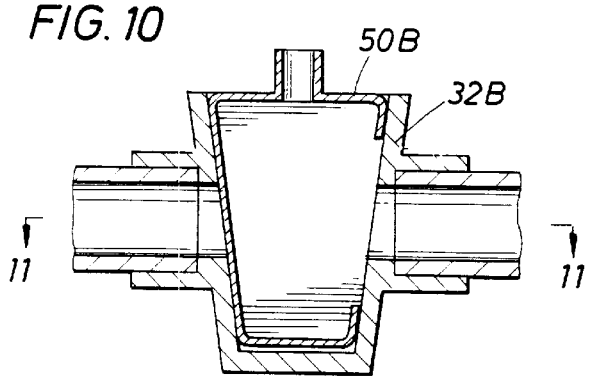
FIG. 10 is a cross sectional elevation view of a third embodiment of the present invention.
Figure 12:
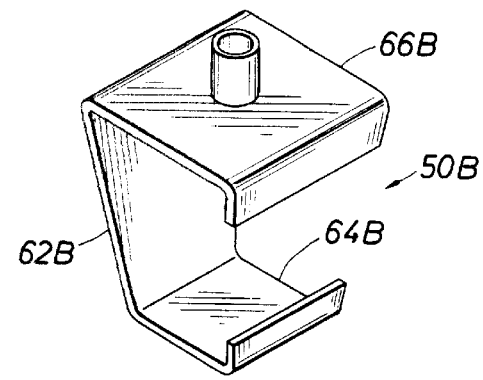
FIG. 12 is an isometric view of the valve plug from the third embodiment of FIG. 10.
Figure 11:
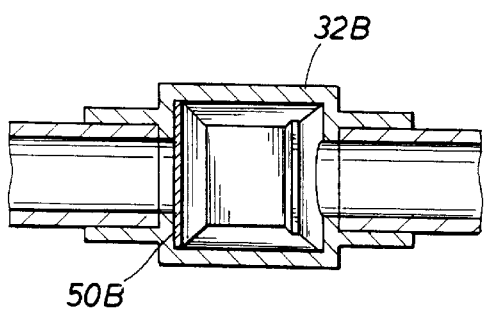
FIG. 11 is a cross sectional view taken along line 11—11 of FIG. 10.

A third embodiment is shown in FIGS. 10, 11, and 12. In this embodiment valve body 32B and valve plug 50B have a truncated pyramidal shape. This second alternative embodiment is constructed and operates similarly to the first alternative embodiment except for the shape variation.

Figure 13:
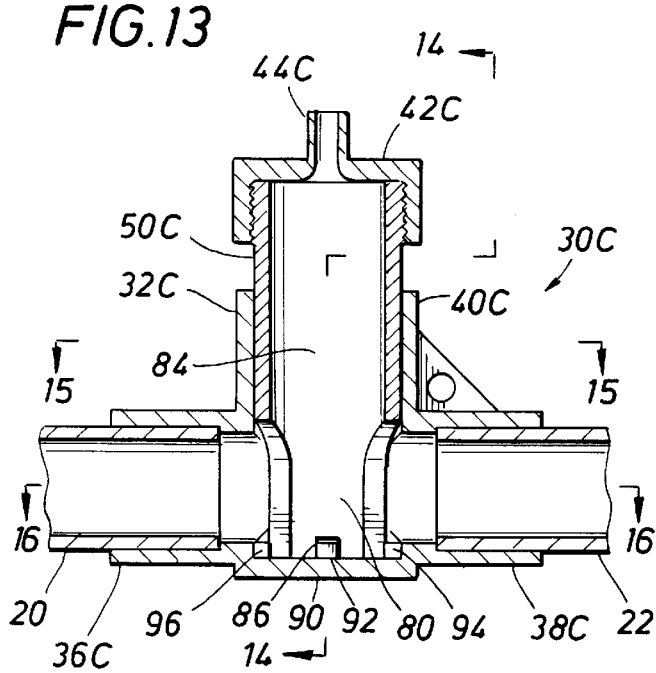
FIG. 13 is a cross sectional elevation view of a fourth embodiment of the present invention.
Figure 14:
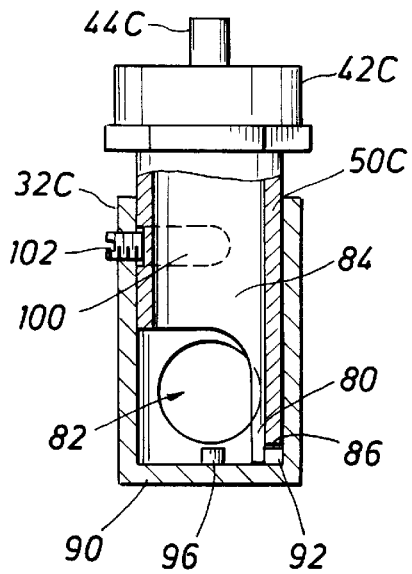
FIG. 14 is a partial cross sectional view taken along the line 14—14 of FIG. 13.

A fourth embodiment is shown in FIGS. 13–18. As shown in FIGS. 13 and 14, valve plug 50C has a blocking portion 80. Blocking portion 80 extends downwardly from an upper portion 84 of valve body 50C, thereby defining an open area 82. Blocking portion 80 maintains the same curved cylindrical radius as upper cylindrical valve plug portion 84. The width of blocking portion 80 should be greater than the inside diameter of inlet member 36C and outlet member 38C.

Valve plug 50C has a notch 86 in the lower portion of blocking member 80. Notch 86 can be of various heights and widths; however, preferably notch 86 has a height approximately equal to the thickness of valve plug 50C.

A valve body 32C is also shown having a base 90 upon which blocking portion 80 can rest. Base 90 has three vertical projections 92, 94, and 96. Vertical projections 92, 94, and 96 are sized to fit within a notch 86 when blocking portion 86 of valve plug 50C is resting on base 90. Preferably, vertical projections 92, 94, and 96 are of the same shape and slightly smaller in width and height than notch 86, thereby permitting a press fit of plug 50C onto notch 86 in various positions as described below which is advantageous. Preferably, vertical projections 94 and 96 are located on base 90 in a position that is approximately along the center line of the openings of inlet members 36C and 38C. Vertical projections 92 is located on base 90 proximate valve body 32C at a position which is approximately perpendicular to the center line of inlet member 36C and outlet member 38C.

Figure 15:
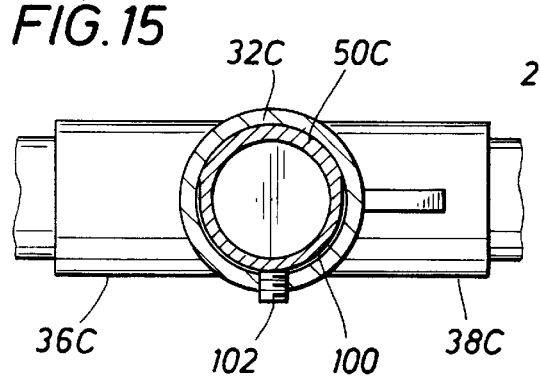
FIG. 15 is a cross sectional view taken along the line 15—15 of FIG. 13.

As shown in FIGS. 14 and 15, valve plug 50C also has a horizontally grooved section 100 on upper portion 84 of valve plug 50C. Valve body 32C is tapped to allow a set screw 102 to project through valve body 32C and engage grooved portion 100 of valve plug 50C. Groove portion 100 and set screw 102 act conjointly to limit the amount of vertical movement possible of valve plug 50C relative to valve body 32C. Preferably, set screw 102 and groove 100 allow vertical movement slightly greater than the height of vertical projections 92, 94, and 96.

Vertical projections 92, 94, and 96 act in conjunction with notch 86 to prevent rotation of valve plug 32C without moving valve plug 32C vertically within valve plug 50C. This prevents inadvertent rotational movement of blocking portion 80 of valve plug 32C relative to valve body 32C.

Figure 16:
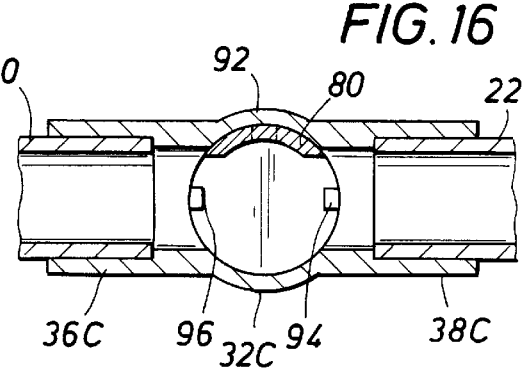
FIG. 16 is a cross sectional view taken along the line 16—16 of FIG. 13.

As shown in FIG. 16, valve plug 50C can be aligned in a first position which allows fluid flow through the valve assembly 30C as fluid runs down drain line 18. In this position, blocking portion 80 is aligned against the inside wall of valve body 32C.

Figure 17:
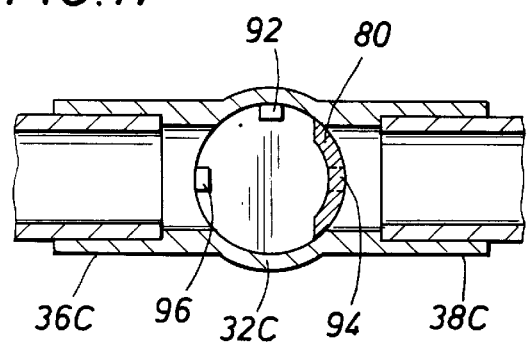
FIG. 17 is a modified cross sectional view of FIG. 13 but in which the valve plug is positioned to close off the downstream side of the drain line.

As shown in FIG. 17, valve plug 50C can be rotated 90° to a second position. In this second position, blocking portion 80 is aligned to cover outlet member 38C. When valve plug 50C is rotated into this second position, downstream portion 22 of drain line 18 is closed off and valve assembly 30C can be used to clear portion 20 of drain line 18 by applying pressure through vent 44C of valve plug 50 and forcing debris out of stream drain line 20 and back into pan 14. Alternatively, a vacuum can be applied to pull debris from upstream drain line 20 forward into valve assembly 30C where it can be removed.

In addition to clearing drain lines, valve assembly 30C can be used to assist in servicing of the evaporator coils 12. With valve plug 50C in the second position, a vacuum can be applied to pull any debris falling off of the evaporator coils 12 during maintenance and thereby prevent future blockages. Additionally, when the valve plug 50C is aligned in the second position, a liquid algaecide can be forced through drain line 20 into pan 14 to help prevent fungus growth.

Figure 18:
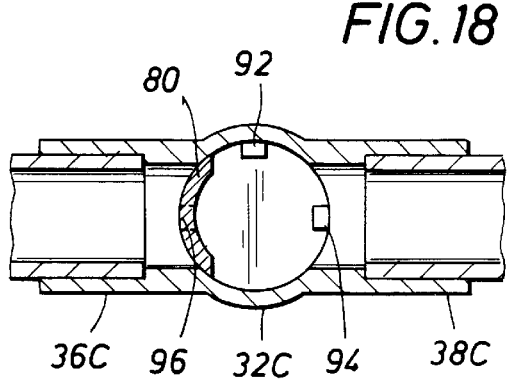
FIG. 18 is a modified cross sectional view of FIG. 13 but in which the valve plug is positioned to close off the upstream side of the drain line.

As shown in FIG. 18, valve plug 50C can be rotated to a third position, one hundred and eighty degrees from the second position, to clear line blockage within portion 22 of drain line 18, downstream of valve assembly 30C. When valve plug 50C is in this third position, blocking portion 80 is aligned with inlet member 36C and upstream portion 20 of drain line 18 is closed off.

It should be understood that there can be improvements and modifications made of the embodiments of the invention described in detail above without departing from the spirit or scope of the invention as set forth in the accompanying claims.

I claim:

1. A valve assembly for clearing air conditioning drain lines with pressure or vacuum comprising:

a hollow valve body having an inlet member, an outlet member, an open top portion, and a base portion; and a hollow, vertically removable valve plug in spaced relationship within said valve body, said valve plug proximally engaging said valve body and having and a blocking portion for selectively preventing fluid communication between said inlet and outlet members and defining an open area within said valve body to allow fluid communication between said inlet and outlet members, said valve plug rotatable from a first position, to a second position, to a third position wherein the first position permits fluid communication between said inlet and outlet members, the second position permits fluid communication between said inlet member and said open top portion and prevents fluid communication with said outlet member, and the third position permits fluid communication between said outlet member and said open top portion and prevents fluid communication with said inlet member; said valve plug being rotatable relative to said valve body following vertical movement of said valve plug within said valve body, wherein said valve plug further comprises a generally horizontal groove, and said valve body comprises a set screw adapted to engage the groove preventing vertical movement of said valve plug relative to said valve body in excess of vertical movement required for rotation.

2. The valve assembly of claim 1, further comprising a means for restraining rotational movement of said valve plug relative to said valve body.

3. The valve assembly of claim 1, wherein said base portion comprises a first vertical projection, a second vertical projection, and a third vertical projection, and said blocking portion comprises a notched portion for engaging said projections so that said notched portion engages said first projection to prevent rotation of said valve plug from the first position without vertical movement to disengage said first projection from said notched portion, said notched portion engages said second projection to prevent rotation of said valve plug from the second position without vertical movement to disengage said second projection from said notched portion, and said notched portion engages said third projection to prevent rotation of said valve plug from the third position without vertical movement to disengage said third projection from said notched portion.

4. The valve assembly of claim 1, further comprising a removable valve cover for covering said valve plug.

5. The valve assembly of claim 4, wherein the removable valve cap contains a vent.

6. The valve assembly of claim 1, further comprising a tablet treatment chamber.

7. A valve assembly for clearing air conditioning drain lines with pressure or vacuum comprising:

a hollow valve body having an inlet member, an outlet member, an open top portion, and a base; said base having a first vertical projection, a second vertical projection, and a third vertical projection; and a hollow, vertically removable valve plug in spaced relationship within said valve body, said valve plug proximally engaging said valve body and having and a blocking portion for selectively preventing fluid communication between said inlet and outlet members and defining an open area within said valve body to allow fluid communication between said inlet and outlet members, said valve plug rotatable from a first position, to a second position, to a third position wherein the first position permits fluid communication between said inlet and outlet members, the second position permits fluid communication between said inlet member and said open top portion and prevents fluid communication with said outlet member, and the third position permits fluid communication between said outlet member and said open top portion and prevents fluid communication with said inlet member;

said blocking portion having a notched portion for engaging said projections so that said notched portion engages said first projection to prevent rotation of said valve plug from the first position without vertical movement to disengage said first projection from said notched portion, said notched portion engages said second projection to prevent rotation of said valve plug from the second position without vertical movement to disengage said second projection from said notched portion, said notched portion engages said third projection to prevent rotation of said valve plug from the third position without vertical movement to disengage said third projection from said notched portion.

8. The valve assembly of claim 7, further comprising a removable valve cover for covering said valve plug.

9. The valve assembly of claim 7, wherein said valve plug further comprises a generally horizontal groove, and said valve body comprises a set screw adapted to engage the groove preventing vertical movement of said valve plug relative to said valve body in excess of the vertical movement required for rotation.

10. The valve assembly of claim 7, wherein the notched portion is proximate to the median portion of the blocking portion.

11. The valve assembly of claim 7, wherein the second projection and third projection being proximate to a centerline of said inlet and outlet members.

12. The valve assembly of claim 7, wherein the valve body and the valve plug are cylindrical.

13. The valve assembly of claim 7, wherein the valve body and the valve plug consisting essentially of polyvinyl chloride.

14. The valve assembly of claim 7, wherein the inner width of the hollow portion of said valve plug being generally equal to or greater than the inner diameter of said inlet and outlet members.

15. The valve assembly of claim 8, wherein the removable valve cap comprises a vent.

16. A valve assembly for clearing air conditioning drain lines with pressure or vacuum comprising:

a hollow valve body having an inlet member, an outlet member, an open top portion, and a base; said base having a first vertical projection, a second vertical projection, and a third vertical projection;

a hollow, vertically removable valve plug in spaced relationship within said valve body, said valve plug proximally engaging said valve body and having and a blocking portion for selectively preventing fluid communication between said inlet and outlet members and defining an open area within said valve body to allow fluid communication between said inlet and outlet members, and a removable valve cover for covering said valve plug, said valve cover comprising a vent;

said valve plug rotatable from a first position, to a second position, to a third position wherein the first position permits fluid communication between said inlet and outlet members, the second position permits fluid communication between said inlet member and said open top portion and prevents fluid communication with said outlet member, and the third position permits fluid communication between said outlet member and said open top portion and prevents fluid communication with said inlet member;

said blocking portion having a notched portion for engaging said projections so that said notched portion engages said first projection to prevent rotation of said valve plug from the first position without vertical movement to disengage said first projection from said notched portion, said notched portion engages said second projection to prevent rotation of said valve plug from the second position without vertical movement to disengage said second projection from said notched portion, said notched portion engages said third projection to prevent rotation of said valve plug from the third position without vertical movement to disengage said third projection from said notched portion.

17. The valve assembly of claim 16, wherein said valve plug further comprises a generally horizontal groove, and said valve body comprises a set screw adapted to engage the groove preventing vertical movement of said valve plug relative to said valve body in excess of the vertical movement required for rotation.

18. The valve assembly of claim 16, wherein the second projection and third projection being proximate to a centerline of said inlet and outlet members.

19. The valve assembly of claim 16, wherein the valve body and the valve plug consisting essentially of polyvinyl chloride.

* * * * *